A. S. MARKHAM.
Car Coupling.
No. 51,330.
Patented Dec. 5, 1865.
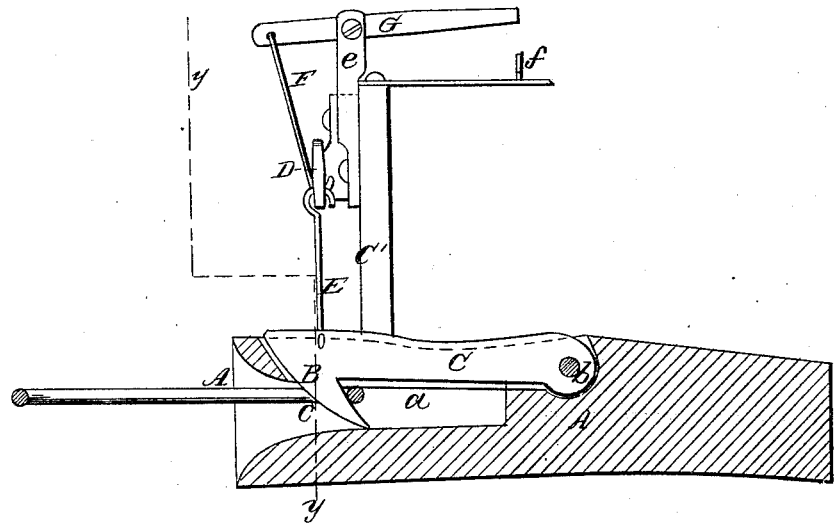
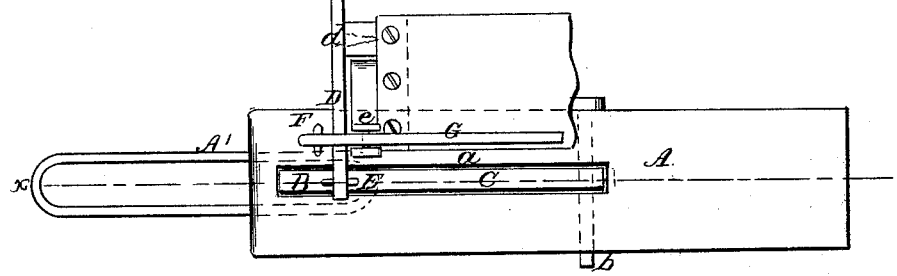
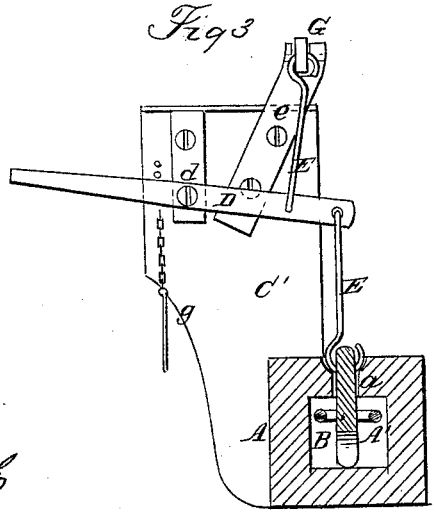

UNITED STATES PATENT OFFICE.

A. S. MARKHAM, OF BUSHNELL, ILLINOIS.

IMPROVED CAR-COUPLING.

Specification forming part of Letters Patent No. 51,330, dated December 5, 1865.

*To all whom it may concern:*

Be it known that I, A. S. MARKHAM, of Bushnell, in the county of McDonough and State of Illinois, have invented a new and Improved Car-Coupling; and I do hereby declare that the following is a full, clear, and exact description thereof, which will enable those skilled in the art to make and use the same, reference being had to the accompanying drawings, forming a part of this specification, in which—

Figure 1 is a longitudinal vertical section of my invention, taken in the line $x$ $x$, Fig. 2; Fig. 2, a plan or top view of the same; Fig. 3, a transverse vertical section of the same, taken in the line $y$ $y$, Fig. 1.

Similar letters of reference indicate corresponding parts.

This invention relates to a new and improved car-coupling of that class which is self-coupling; and it consists in connecting with a drop-hook two levers arranged in such a manner that the hook may be raised and the link or shackle liberated either from the platform of the car or from the side of the platform, as may be most convenient.

A represents a draw-head, which may be of the usual or any proper form, and has an oblong slot or opening, $a$, in its top, in which a hook, B, works, said hook being at the end of an arm, C, through which a pin or pivot, $b$, passes, and on which the arm is allowed to work or turn freely. This hook B has its outer surface rounded, as shown at $c$ in Fig. 1, so that the hook may be readily thrown up by the entrance of the link or shackle A', as will be understood by referring to Fig. 1.

To one side of the draw-head A there is attached an upright, C', having a lever, D, connected to it by a fulcrum-pin, $d$, and having its inner end connected by a link, E, with the hook B, as shown clearly in Fig. 3, the outer end of said lever projecting beyond the side of the platform of the car.

The lever D is connected by a link, F, with a lever, G, the fulcrum-pin of which is in a bar, $e$, attached to the upright C. This lever G has a longitudinal position relatively with the platform and car, and extends over the platform, or is within convenient reach therefrom. By means of these two levers it will be seen that the hook B may be raised and the link E liberated either from the ground at the side of the platform or from the top of the platform. In the former case the lever D is operated and in the latter case the lever G. There is no occasion for a person passing between the platforms of the cars in order to disconnect them.

The hook B may be retained in an elevated state to prevent coupling by placing the lever G under a hook, $f$, attached to the platform of the car or to any fixture connected therewith; or, if the hook be raised by the lever D, the latter may be held by a pin, $g$, passing into a hole in the upright C.

The device is extremely simple, and does not involve any material increase in the cost of construction over the ordinary couplings.

I do not claim the drop-hook B, for that has been previously used; but

I do claim as new and desire to secure by Letters Patent—

The drop-hook B in the draw-head A, in combination with the levers D G, connected to the hook, and also connected together relatively with each other, substantially as and for the purpose herein set forth.

A. S. MARKHAM.

Witnesses:
G. C. RIDINGS,
CHARLES MARKHAM.